Figure 1:
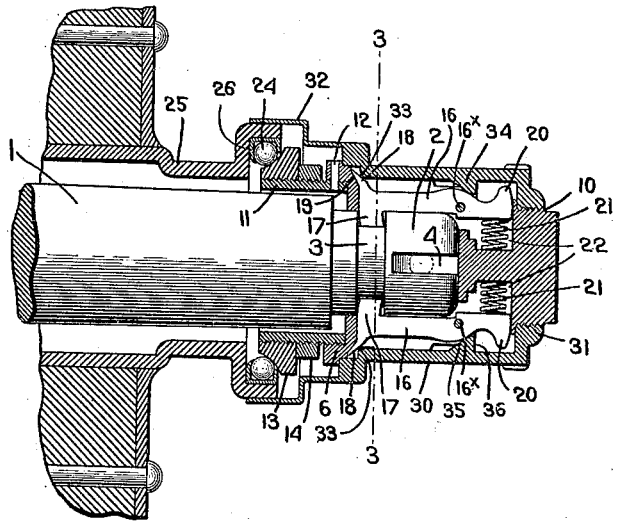

E. M. AYRES.
WHEEL RETAINING DEVICE.
APPLICATION FILED JUNE 25, 1915.

1,194,698.

Patented Aug. 15, 1916.

Inventor.
Ellen M. Ayres,
by Heard Smith & Tennant.
Atty's.

UNITED STATES PATENT OFFICE.

ELLEN M. AYRES, OF BOSTON, MASSACHUSETTS.

WHEEL-RETAINING DEVICE.

1,194,698.  Specification of Letters Patent.  Patented Aug. 15, 1916.

Application filed June 25, 1915. Serial No. 36,234.

*To all whom it may concern:*

Be it known that I, ELLEN M. AYRES, a citizen of the United States, and resident of Boston, county of Suffolk, State of Massachusetts, have invented an Improvement in Wheel-Retaining Devices, of which the following description, in connection with the accompanying drawing, is a specification, like characters on the drawing representing like parts.

This invention relates to improvements in wheel retaining devices and the principal objects thereof are to provide a wheel retaining device which may be easily removed from the axle of a vehicle such as automobiles, trucks, carriages and the like and which being removed would permit the easy removal of the wheel and also providing means whereby the bearings between the axle and the hub may be easily and readily adjusted.

In the usual types of wheels for automobiles ball bearings are provided intermediate of the shaft and the hub of the wheels and the mechanism for holding the bearings properly in place is such that it is difficult to remove the wheel without the use of a special "wheel puller" which is adapted to be attached to the hub of the wheel and provided with a screw or like device engaging the end of the axle to start the wheel on the axle. This difficulty is occasioned mainly by reason of the fact that the ball raceways at the inner and outer ends of a wheel head are so arranged that the wheel can have no lateral movement when the nut which secures the same in place is removed, and it is therefore necessary that the wheel shall be pulled off by a force coming directly in alinement with the axis of the axle.

By the present invention means are provided by which the wheel retaining device may be removed readily by merely disengaging certain locking members and thereafter removing the retaining device, such a retaining device being applicable not only to wheels having ball bearings but to any of the common types of wheels.

Another feature of the invention which is of particular importance resides in providing the wheel retaining device for a ball bearing wheel with a raceway which is carried by the retaining device and is removable therewith so that when this raceway is removed the wheel may be moved laterally by power applied to the rim or spokes thereof to start it upon the axle and thereafter to permit its ready removal.

Another feature of the invention consists in adjustably securing the ball raceway upon the retaining device by screw connection or otherwise so that the same may be readily adjusted relatively to the members which lock the retaining device upon the axle so that when the parts are assembled the proper relation between the bearings will at all times be assured.

Another feature of the invention resides in providing a wheel retaining device with means for easily detaching the same from the axle with a cap or covering adapted not only to protect the device from dust but which will also serve to lock the retaining device permanently in position.

Another feature of the invention consists in providing means for preventing the loss of the cap if the same should accidentally become unscrewed.

Other features of the invention will more fully appear from the accompanying drawing, and the following specification and will be pointed out in the annexed claims.

Figure 2:
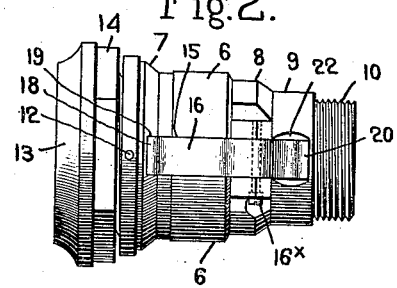
Figure 3:
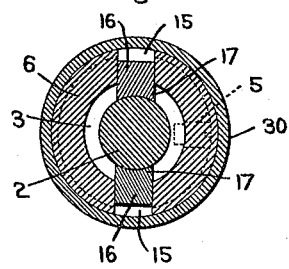

One of the preferred forms of the invention is illustrated in the drawings, in which:

Figure 1 is a vertical longitudinal sectional view of a wheel retaining device and axle and a portion of the hub of a wheel provided with ball bearings being shown in operative relation thereto, Fig. 2 is a plan view of the same, and Fig. 3 is a vertical sectional view on lines 3—3, Fig. 1.

The invention is illustrated in the accompanying drawings as applied to a wheel and axle of an automobile or truck in which ball bearings are interposed between the hub of the wheel and the axle. Inasmuch as the wheel and axle may be of the usual construction it is sufficient for the purposes of the invention that the drawings show the ball bearing at the end of the axle and the retaining device in relation thereto it being understood that the usual balls and raceways are present at the inner end of the hub. As shown herein the axle 1 is turned down at its end beyond the ball bearing to provide a cylindrical extension 2, a recess 3, preferably an annular groove, being formed therein to receive the locking members of the wheel retaining device.

The end portion of the extension 2 may also be provided with a longitudinally extending groove 4 adapted to receive a suitable stud or screw 5 carried by the retaining device to prevent the latter from rotating upon the axle.

The wheel retaining device is preferably in the form of a cylindrical member or collar 6 having an enlarged portion 7 at the inner end and portions of decreased diameter 8 and 9 toward its outer end, the outer end terminating in a screw threaded portion 10 adapted to receive an inclosing protecting and locking sleeve which will hereinafter be described.

The wheel retaining member 6 may be of steel, brass, or any suitable material and preferably is provided with an inwardly extending steel sleeve 11 which may be screw threaded into the member 6 and retained therein by pins 12, the screw threaded circumference of the sleeve 11 serving to support adjustably a ball race 13 which may be locked thereon in any desired adjusted position by a suitable lock nut 14 operable by a wrench in the usual manner. The wheel retaining member or collar 6 is desirably bored to fit closely the cylindrical extension 2 of the axle and the screw 5 seated therein being adapted to engage the slot 4 in the axle to prevent rotation thereon as above described.

The wheel retaining member is provided with one or more longitudinally disposed slots 15 in which are mounted levers 16 pivoted upon studs 16$^x$ passing through a sector of the intermediate portion 8 of the retaining device. The inner end of the levers 16 are provided with extensions 17 adapted to engage the annular recess 3 in the axial extension. These ends are also provided with outwardly extending beveled portions 18 adapted to engage and lie in recesses 19 in the periphery of the enlarged portion of the retaining member. The opposite ends of the levers 16 are provided with upwardly extending members or tails 20 which project beyond the periphery of the reduced cylindrical portion 9 of the wheel retaining member.

The recess engaging projection 17 of the levers 16 is retained normally in engagement with the groove 3 of the axle by helical springs 21 which may be seated in apertures 22 in the integral end portion of the wheel retaining member.

It will be obvious from the construction above described and as illustrated in the drawing that in order to apply the wheel retaining member to the axle it is merely necessary to grasp the projecting tails 20 of the lever 16 between the thumb and finger, thrust the retaining member upon the axle and rotate the same until the pin or screw 5 enters the slot 4 in the axle, whereupon the retaining member may be thrust farther forward upon the axle until the extensions 17 of the lever 16 register with the recess 3 in the axle extension, thereupon the levers 20 may be released by the fingers, thus permitting the springs 21 to force the extensions 17 into said recess, whereupon the retaining member will be securely locked upon the end of the axle.

It will be readily understood that the inner end of the retaining member if adapted to the ordinary wheel may be provided with a flange or abutment adapted to engage the end of a hub or may be made to engage the end of the ball bearing member if desired. However as has heretofore been pointed out it is desirable in wheels having ball bearings that the outer race for the ball bearing may be removed in order that the wheel may be more readily loosened from the axle, and to permit such action the form of wheel retaining device disclosed in the present invention comprises the adjustable raceway and locking nut above described.

By properly adjusting the raceway relatively to the locking extensions 17 of the levers 16 the curved ball engaging race 13 may be made to operatively contact with the series of balls 24 which may be retained in the hub 25 by a suitable cage 26 so that when the wheel retaining member is in place the proper relation between the balls and other raceways will be immediately established. If there is improper adjustment between the raceway 13 and the balls 24 it will be easily recognized since one of two conditions will exist. (1) If the raceway 13 is screwed too far inwardly it will be impossible to thrust the ball retaining member upon the axle a sufficient distance to cause the extensions 17 of the lever 16 to engage the annular groove 3, (2) if on the other hand the raceway 13 is backed off to too great an extent the wheel retaining device will be locked before the wheel is properly positioned, in such case the wheel will be capable of sufficient lateral movement to be easily detected by applying pressure to diametrically opposite portions of the rim. It will be obvious therefore that the proper adjustment of the race 13 may be easily and accurately established.

In order to provide means for excluding the dust from the bearing and from the wheel retaining device and also in order to provide means for preventing accidental removal of the wheel retaining device I have provided a sleeve or cap which in addition to performing these functions also serves to retain positively the extensions 17 in engagement with the recess 3 when the wheel retaining device is in position upon the axle. As illustrated herein this protecting cap or cover comprises a sleeve 30 having a screw threaded head 31 adapted to engage a screw threaded extension 10 of the wheel retaining device, the sleeve 30 being provided with an enlarged extension 32 adapted to surround the ball raceway and preferably also a portion of the end of the hub.

The sleeve may be made of cast brass and may be turned or bored to approximately fit the respective portions 6, 7, 8 and 9 of the wheel retaining device.

In order to lock the end 17 of the levers 16 in engagement with a recess 3 of the axle the sleeve 30 is provided with a face or section 33 which when the sleeve is screwed in upon the extension 10 will engage the outer extensions 19 of the levers and retain them from movement.

In order to prevent the collar from becoming lost, if by the rattling of the wheels it should become unscrewed from the portion 10 of the wheel retaining device, I have provided the sleeve 30 with an internal rib 34 which preferably is beveled upon one side 35 and substantially flat upon the other 36 so that when the cap is to be pressed into position the beveled portion 35 will ride easily over the ends 20 of the levers 16 so that the screw threads upon the sleeve may engage the coöperating threads upon the extension 10. If, however, the sleeve becomes loose the flat portion 36 will engage the extensions 20 immediately after the screw threaded portions of the sleeve and extension 10 have become disengaged so that the sleeve may rotate freely upon the retaining device without becoming detached therefrom and lost.

It is to be understood that the embodiment of the invention disclosed herein is illustrative merely but not in any way restrictive and that the same may be embodied in many other forms, it is also to be understood that while the invention is disclosed in connection with a certain type of ball bearing the various features thereof may be utilized in connection with other and various types of bearings which may or may not involve the use of balls, rollers, or other anti-friction devices.

Having thus described my invention what I claim as new and desire to secure by Letters Patent is:

1. A wheel retainer having a socket to receive the end of an axle, means for connecting the wheel retainer to such axle and an inclosing and protecting sleeve for said wheel retainer having means for locking said connecting means against removal.

2. A wheel retainer comprising a collar having a socket to receive the recessed end of an axle and provided with a longitudinally disposed aperture, a lever pivotally mounted in said aperture having at one end means for engaging said axle recess and projecting at its opposite end beyond the periphery of said collar, means for normally holding the axle engaging means in said recess and an inclosing sleeve removably secured upon said collar and having means for locking the axle engaging means against removal.

3. A wheel retainer comprising a collar having a socket to receive the axle having a recessed end and provided with a longitudinally disposed aperture, a lever pivotally mounted in said aperture having at one end means for engaging said axle recess and at its opposite end projecting beyond the periphery of the collar, resilient means for normally holding the axle engaging means in the axle recess and an inclosing sleeve having an internal rib engaging said lever and locking the same against displacement detachably secured to said collar.

4. A wheel retainer comprising a collar having a socket to receive the end of an axle provided with a locking recess, and a plurality of longitudinal apertures, levers mounted in said apertures having at one end inwardly extending projections to engage said locking recess and at the other end members projecting beyond the periphery of said collar, springs normally adapted to force said inwardly projecting portions into engagement with said recess and a sleeve removably secured to said collar having means for locking said levers in axle engaging position.

5. A wheel retainer comprising a collar having a socket to receive the end of an axle provided with an annular locking recess and a plurality of longitudinal apertures communicating with said socket, levers mounted in said apertures having at one end inwardly projecting portions to engage said locking recess and at the other end members projecting beyond the periphery of said collar, springs normally adapted to force said inwardly projecting portions into engagement with said locking recess, a sleeve inclosing said collar, and screw threaded thereon adapted to engage said levers and lock the same in axle engaging position.

6. A wheel retainer comprising a collar having a socket to receive the end of an axle provided with a locking recess and a plurality of longitudinal apertures communicating with said socket, levers mounted in said apertures having at one end inwardly projecting portions to engage said locking recess and at the other end members projecting beyond the periphery of said collar, springs normally adapted to force said inwardly projecting portions into engagement with said locking recess, a sleeve inclosing said collar and screw threaded thereon, an internal rib on said sleeve adapted to engage said levers and lock the same in axle engaging position, and to engage the upwardly projecting ends of said levers to prevent the loss of said sleeve if accidentally unscrewed from lever locking position.

7. In combination, an axle having an extended recessed end, a wheel mounted on said axle having ball bearings including a cage containing a series of balls, a wheel retainer having a socket to receive the end of said axle, means upon said wheel retainer for detachably engaging said axle recess, a ball race on said retainer adapted to coöperate with the balls in said cage.

8. In combination, an axle having an extended and recessed end, a wheel mounted on said axle, ball bearings for said wheel including a cage containing a series of balls, a wheel retainer having a socket to receive the end of said axle and means on said retainer detachably engaging said axle recess, a ball race adjustably mounted upon said retainer and means for locking the same in adjusted position whereby the relative positions of the race and axle engaging means may be fixed.

9. In combination, an axle having a recessed end, a wheel mounted upon said axle, ball bearings for said wheel including a cage containing a series of balls, a wheel retainer comprising a collar having a socket adapted to receive the end of said axle, means for detachably connecting said retainer to said axle, a ball race screwed upon said collar and a check nut adapted to maintain said ball race in adjusted position whereby the relative positions of the ball race and the axle engaging means of the retainer may be fixed.

10. A combined wheel retainer and bearing for a ball bearing wheel comprising a collar having a socket to receive the end of an axle, means for locking said collar to said axle and an annular ball race adapted to coöperate with bearings carried by the wheel hub.

11. A combined wheel retainer and bearing for a ball bearing wheel comprising a collar having a socket to receive the end of an axle, means for locking said collar to said axle, an annular raceway adapted to coöperate with balls carried by the wheel and means for adjusting said annular member relatively to the locking member.

12. A wheel retainer comprising a collar having a socket to receive the end of an axle, means for detachably locking said collar to said axle and an adjustable member upon said collar adapted to engage the end of the wheel hub and means for locking said member in adjustable position.

13. A wheel retainer comprising a collar having a socket to receive the end of an axle, means for detachably locking said collar to said axle, a screw threaded sleeve on said collar, a hub engaging member having screw threads engaging the threads of said collar and adjustable thereon and a locking nut for retaining said member in adjusted position.

In testimony whereof, I have signed my name to this specification.

ELLEN M. AYRES. [L. S.]